(12) United States Patent  
Haridoss

(10) Patent No.: US 6,696,190 B2  
(45) Date of Patent: Feb. 24, 2004

(54) FUEL CELL SYSTEM AND METHOD

(75) Inventor: Prathap Haridoss, Watervliet, NY (US)

(73) Assignee: Plug Power Inc., Latham, NY (US)

( * ) Notice: Subject to any disclaimer, the term of this patent is extended or adjusted under 35 U.S.C. 154(b) by 336 days.

(21) Appl. No.: 09/896,333

(22) Filed: Jun. 29, 2001

(65) Prior Publication Data

US 2003/0003333 A1 Jan. 2, 2003

(51) Int. Cl.$^7$ ............................................. H01M 8/04
(52) U.S. Cl. ........................ 429/22; 429/23; 429/30; 429/32; 429/33
(58) Field of Search ............................ 429/30, 33, 22, 429/23, 32

(56) References Cited

U.S. PATENT DOCUMENTS 6,186,254 B1 * 2/2001 Mufford et al. ............ 180/65.3
6,242,120 B1 * 6/2001 Herron ........................ 429/22

* cited by examiner

*Primary Examiner*—Bruce F. Bell
(74) *Attorney, Agent, or Firm*—Fish & Richardson P.C.

(57) ABSTRACT

Fuel cells, fuel cell systems and methods of operating same are disclosed.

11 Claims, 5 Drawing Sheets

FUEL CELL SYSTEM AND METHOD

TECHNICAL FIELD

The invention relates to fuel cells, fuel cell systems and methods of operating the same.

BACKGROUND

A fuel cell can convert chemical energy to electrical energy by promoting an electrochemical reaction between two gases.

One type of fuel cell includes a cathode flow field plate, an anode flow field plate, a membrane electrode assembly (commonly abbreviated MEA) disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a proton exchange membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, one of the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas passes through the anode gas diffusion layer and interacts with the anode catalyst. Similarly, as the cathode gas flows through the channels of the cathode flow field plate, the cathode gas passes through the cathode gas diffusion layer and interacts with the cathode catalyst.

The anode catalyst interacts with the anode gas to catalyze the conversion of the anode gas to reaction intermediates. The reaction intermediates include ions and electrons. The cathode catalyst interacts with the cathode gas and the reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Electrons are formed at the anode side of the membrane electrode assembly, indicating that the anode gas undergoes oxidation during the fuel cell reaction. Electrons are consumed at the cathode side of the membrane electrode assembly, indicating that the cathode gas undergoes reduction during the fuel cell reaction.

For example, when hydrogen and oxygen are the gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ + 2e^- \qquad (1)$$

$$\tfrac{1}{2}O_2 + 2H^+ + 2e^- \rightarrow H_2O \qquad (2)$$

$$H_2 + \tfrac{1}{2}O_2 \rightarrow H_2O \qquad (3)$$

As shown in equation 1, the hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell. Typically, the coolant is eventually circulated through a coolant loop external to the fuel cell where its temperature is reduced. The coolant is then recirculated through the coolant flow field plate.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack typically also includes monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

Typically, in a fuel cell stack, the inlets (e.g., anode gas inlet, cathode gas inlet and coolant inlet) of the flow field plates are aligned to form inlet manifolds (e.g., anode gas inlet manifold, cathode gas inlet manifold and coolant inlet manifold, respectively). The fluids (e.g., anode gas, cathode gas and coolant, respectively) flow along their respective inlet manifolds (e.g., anode gas inlet manifold, cathode gas inlet manifold, coolant inlet manifold, respectively) and enter their respective flow field plates (e.g., anode flow field plate, cathode flow field plate and coolant flow field plate, respectively) via their respective inlet regions (e.g., anode gas inlet region, cathode gas inlet region and coolant inlet region, respectively). Generally, a fuel cell stack has similarly aligned outlets of the flow field plates to form respective outlet manifolds that are in fluid communication with their respective outlet regions and that operate in a similar fashion to the inlet manifolds.

SUMMARY

The invention relates to fuel cells, fuel cell systems and methods of operating same. In general, the systems and methods are designed so that, during periods of operation when the amount of anode gas available in the fuel cell or fuel cell stack is below a desired stoichiometric amount or may be expected to soon be below a desired stoichiometric amount, the amount of cathode gas in the fuel cell or fuel cell stack is reduced. Typically, the amount of cathode gas in the fuel cell or fuel cell stack is reduced so that it is below a desired stoichiometric amount. An example of a period of operation where a fuel cell or fuel cell stack may have less than a desired stoichiometric amount of an anode gas is when there is a transient in the demand for electrical power output by the fuel cell or fuel cell stack, such as when an electrical load (e.g., a residence and/or an automobile) on the fuel cell or the fuel cell stack increases relatively suddenly.

A desired stoichiometric amount of an anode gas in a fuel cell or a fuel cell stack refers to the amount of the anode gas in the fuel cell or fuel cell stack relative to a given electrical load (e.g., a residence and/or an automobile). A desired stoichiometric amount of an cathode gas in a fuel cell or a fuel cell stack refers to the amount of the cathode gas in the fuel cell or fuel cell stack relative to a given electrical load (e.g., a residence and/or an automobile).

In certain embodiments, when the amount of cathode gas in the fuel cell or fuel cell stack is reduced, an auxiliary power supply (e.g., a battery) can be used to provide power to an electrical load on the fuel cell or fuel cell stack. In some embodiments, the auxiliary power supply can be used to supply all the power demanded by the electrical load. In certain embodiments, the auxiliary power supply can be used to supply a portion of the power demanded by the electrical load. The auxiliary power supply and fuel cell or fuel cell stack can be, for example, in parallel electrical communication with the electrical load.

In one aspect, the invention provides a fuel cell stack system. The system includes a fuel cell stack having a cathode gas manifold, a sensor, an apparatus (e.g., a blower and/or a pump) configured to urge a cathode gas to the cathode gas manifold during operation of the fuel cell stack, and a controller. The sensor is configured to monitor a parameter associated with performance of the fuel cell stack during operation of the fuel cell stack. The controller is in electrical communication with the sensor and the apparatus so that, when the parameter reaches a predetermined value the controller sends a signal to the apparatus that reduces the flow rate of the cathode gas to the cathode gas manifold. In some embodiments, the controller reduces the electrical power to the apparatus.

In another aspect, the invention features a fuel cell stack system that includes a fuel cell stack having a cathode gas manifold, a sensor, a first apparatus (e.g., a blower and/or a pump) configured to urge a cathode gas to the cathode gas manifold during operation of the fuel cell stack, a switching apparatus (e.g., a valve), and a controller. The sensor is configured to monitor a parameter associated with performance of the fuel cell stack during operation of the fuel cell stack. The switching apparatus is located between the first apparatus and the cathode gas manifold. The switching apparatus is configured to manipulate a flow rate of cathode gas to the gas manifold. The controller is in electrical communication with the sensor and the switching apparatus so that, when the sensor determines that the parameter reaches a predetermined value, the controller sends a signal to switching apparatus that reduces the flow rate of the cathode gas to the cathode gas manifold. In some embodiments, when the sensor determines that the parameter reaches the predetermined value, the controller changes a position of the switching apparatus to decrease the flow rate of cathode gas to the manifold.

Embodiments of fuel cell stack systems can include one or more of the following features.

The fuel cell stack can be a plurality of PEM-type fuel cells (e.g., 88 PEM-type fuel cells).

The parameter monitored by the sensor can be an electrical current associated with an electrical load on the fuel cell stack, a change in level of electrical current associated with the electrical load, an electrical potential associated with the electrical load, a change in level of the electrical potential associated with the electrical load, an electrical power associated with the electrical load, and/or a change in level of the electrical power associated with the electrical load.

The parameter monitored by the sensor can be an amount of a reactant gas (e.g., a cathode gas and/or an anode gas) present at an anode gas outlet of the fuel cell stack and/or an amount of a reactant gas (e.g., a cathode gas and/or an anode gas) present at a cathode gas outlet of the fuel cell stack.

The fuel cell system can further include an auxiliary power supply. The auxiliary power supply can be configured so that the auxiliary power supply and the fuel cell stack are in parallel electrical communication with an electrical load so that, when the parameter reaches the predetermined value, the electrical power output of the auxiliary power system increases.

The controller can be manually controlled in response to the sensor, and/or the controller can be computer controlled in response to the sensor.

In a further aspect, the invention features a fuel cell system that includes a fuel cell having a cathode flow field plate, a sensor, an apparatus (e.g., a blower and/or a pump) configured to urge a cathode gas to the cathode flow field plate during operation of the fuel cell, and a controller. The sensor is configured to monitor a parameter associated with performance of the fuel cell during operation of the fuel cell. The controller is in electrical communication with the sensor and the apparatus so that, when the parameter reaches a predetermined value, the controller sends a signal to the apparatus that reduces the flow rate of the cathode gas to the cathode flow field plate.

In another aspect, the invention features a fuel cell system that includes a fuel cell having a cathode flow field plate, a sensor, a first apparatus (e.g., a blower and/or a pump) configured to urge a cathode gas to the cathode flow field plate during operation of the fuel cell along a flow path between the first apparatus and the cathode flow field plate, a switching apparatus (e.g., a valve), and a controller. The sensor is configured to monitor a parameter associated with performance of the fuel cell during operation of the fuel cell. The switching apparatus is located between the first apparatus and the cathode flow field plate along the flow path between the first apparatus and the cathode flow field plate, and the switching apparatus is configured to manipulate a flow rate of cathode gas to the cathode flow field plate. The controller is in electrical communication with the sensor and the first apparatus so that, when the parameter reaches a predetermined value, the controller sends a signal to the switching apparatus that reduces the flow rate of cathode gas to the cathode flow field plate. The fuel cell in a fuel cell system can be, for example, a PEM-type fuel cell.

In one aspect, the invention features a method of operating a fuel cell stack having a cathode gas manifold. The method includes reducing a flow rate of a cathode gas to the cathode gas manifold in response to a change in an electrical load placed on the fuel cell stack.

The change in the electrical load on the fuel cell stack can correspond to an increase in the electrical load on the fuel cell stack.

In some embodiments, the flow rate of anode gas to the anode gas manifold of the fuel cell stack is substantially unchanged when the flow rate of the cathode gas to the cathode gas manifold is reduced.

In certain embodiments, the flow rate of anode gas to the anode gas manifold of the fuel cell stack increases when the flow rate of the cathode gas to the cathode gas manifold is reduced.

The method can further include increasing an electrical power to the electrical load from an auxiliary power source (e.g., a battery) when the flow rate of the cathode gas to the cathode gas manifold is reduced.

The flow rate of the cathode gas to the cathode gas manifold can be reduced by decreasing electrical power to an apparatus (e.g., a blower and/or a pump) that urges the cathode gas to the cathode gas manifold.

The flow rate of the cathode gas to the cathode gas manifold can be reduced by changing a position of a switching apparatus (e.g., a valve) between another apparatus (e.g., a blower and/or a pump) and the cathode gas manifold along a flow path between the cathode gas manifold and the other apparatus.

The method can further include, after reducing the flow rate of the cathode gas to the cathode gas manifold, increasing the flow rate of the cathode gas to the cathode gas manifold.

The flow rate of the cathode gas to the cathode gas manifold can be increased when the flow rate of the anode gas to the anode gas manifold of the fuel cell stack is sufficient so that the fuel cell stack can provide an amount of electrical power that is at least about as much as an electrical power of the electrical load.

The flow rate of the cathode gas to the cathode gas manifold can be increased when the flow rate of the anode gas to the anode gas manifold of the fuel cell stack is sufficient so that the fuel cell stack can provide an electrical power that is at least some predetermined fraction of electrical power of the electrical load.

In another aspect, the invention features a method of operating a fuel cell having a cathode flow field plate. The method includes reducing a flow rate of a cathode gas to the cathode flow field plate in response to a change in an electrical load placed on the fuel cell.

The change in the electrical load on the fuel cell can correspond to an increase in the electrical load on the fuel cell.

In some embodiments, the flow rate of anode gas to the anode flow field plate of the fuel cell is substantially unchanged when the flow rate of the cathode gas to the cathode flow field plate is reduced.

In certain embodiments, the flow rate of anode gas to the anode flow field plate of the fuel cell is increased when the flow rate of the cathode gas to the cathode flow field plate is reduced.

The method can further include increasing an electrical power to the electrical load from an auxiliary power source (e.g., a battery) when the flow rate of the cathode gas to the cathode flow field plate is reduced.

The flow rate of the cathode gas to the cathode flow field plate can be reduced by decreasing electrical power to an apparatus (e.g., a blower and/or a pump) that urges the cathode gas to the cathode flow field plate.

The flow rate of the cathode gas to the cathode flow field plate can be reduced by changing a position of a switching apparatus (e.g., a valve) between another apparatus (e.g., a blower and/or a pump) and the cathode flow field plate along a flow path between the cathode flow field plate and the other apparatus.

In a further aspect, the invention features a method of operating a fuel cell stack having a cathode gas manifold. The method includes reducing a flow rate of a cathode gas to the cathode gas manifold in response to a change in a parameter associated with performance of the fuel cell stack. The parameter can be, for example, an amount of a reactant gas present at a cathode gas outlet region of the fuel cell stack and/or an amount of a reactant gas present at an anode gas outlet region of the fuel cell stack.

In another aspect, the invention features a method of operating a fuel cell having a cathode flow field plate. The method includes reducing a flow rate of a cathode gas to the cathode flow field plate in response to a change in a parameter associated with performance of the fuel cell. The parameter can be, for example, an amount of a reactant gas present at a cathode gas outlet region of the fuel cell stack and/or an amount of a reactant gas present at an anode gas outlet region of the fuel cell stack.

Other features, aspects and advantages of the invention will be apparent from the description, drawings and the claims.

DETAILED DESCRIPTION

Figure 1:
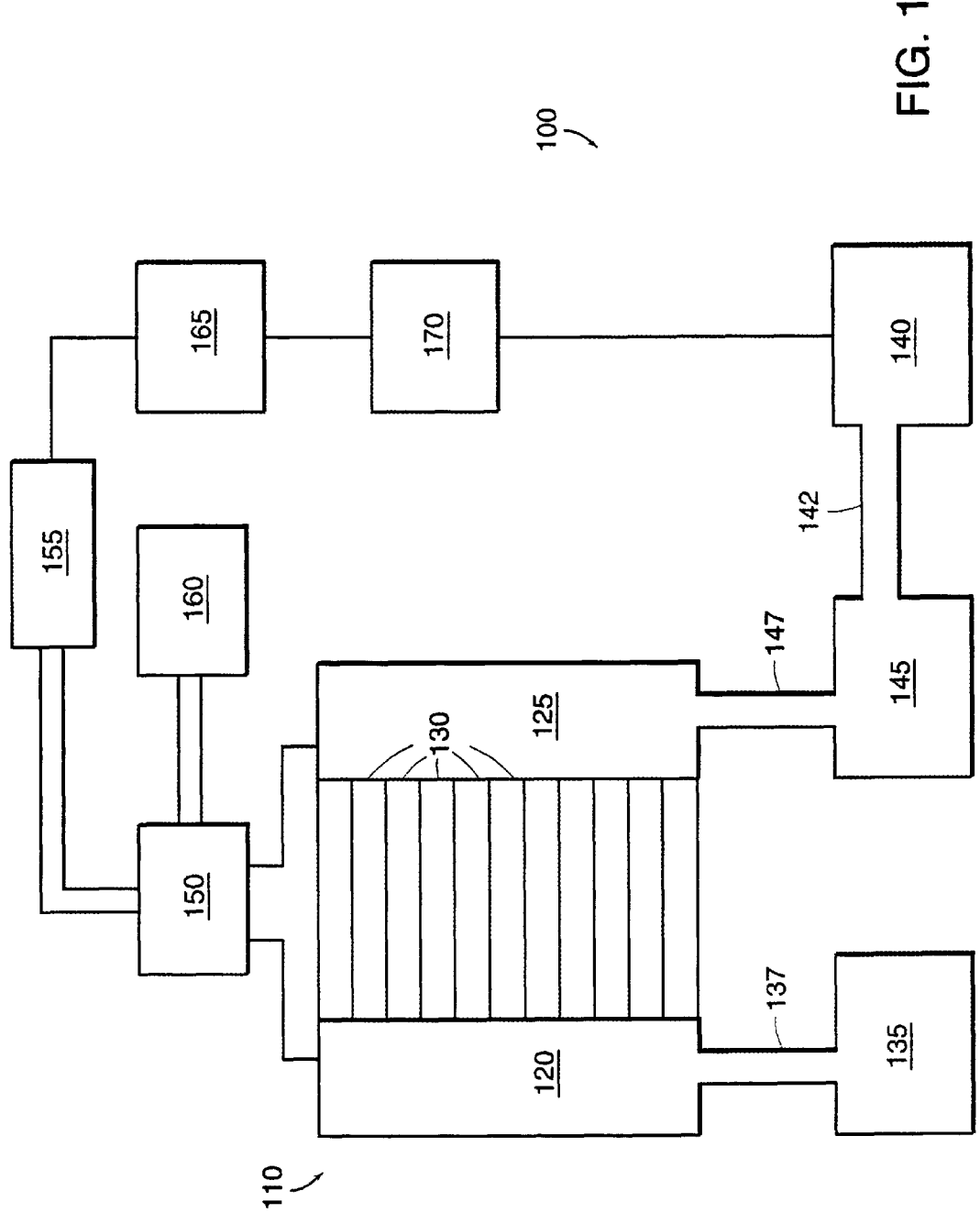
FIG. 1 is a block diagram of an embodiment of a fuel cell system.

FIG. 1 shows a block diagram of a fuel cell system 100 that includes a fuel cell stack 110 having an anode gas manifold 120, a cathode gas manifold 125 and a plurality of fuel cells 130 (e.g., a plurality of PEM-type fuel cells, such as 88 PEM-type fuel cells) in fluid communication with manifolds 120 and 125. An anode gas source 135 (e.g., a reformer, such as a reformer for converting hydrocarbons to hydrogen, or a storage supply of hydrogen), supplies fuel gas to anode gas manifold 120 via conduit 137. A blower 145, which is in fluid communication with a cathode gas source 140 (e.g., air, such as ambient air, or a storage supply of oxygen) via conduit 142, urges cathode gas from source 140 to cathode gas manifold 125. The cathode gas flows from blower 145 to manifold 125 via conduit 147.

Although shown in FIG. 1 as being between source 140 and manifold 125, blower 145 can be disposed in other locations within system 100. For example, system 100 can be arranged so that source 140 is located between blower 145 and manifold 125 along a fluid flow path from between blower 145 and manifold 125.

Figure 2:
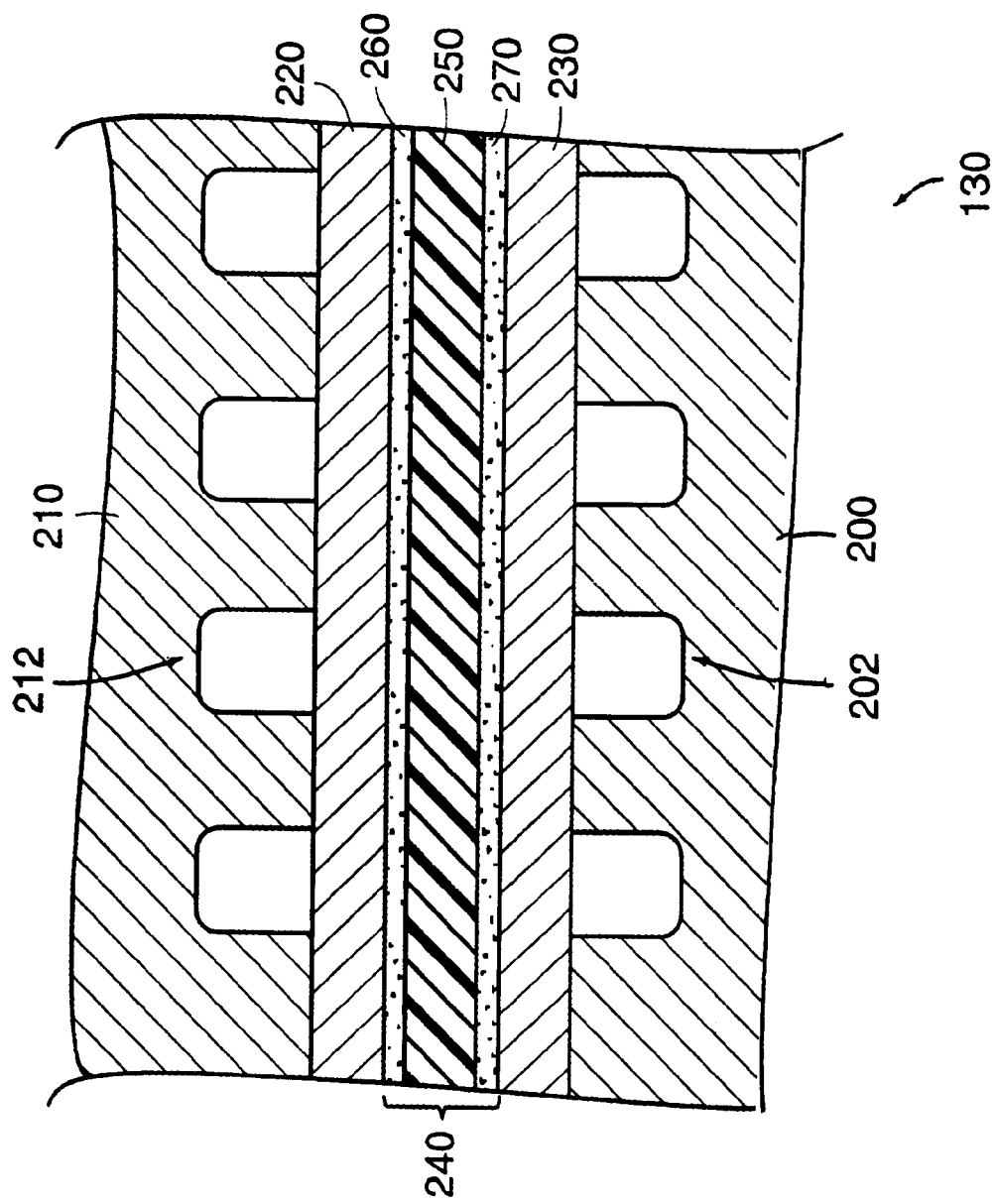
FIG. 2 is a cross-sectional view of an embodiment of a fuel cell.

FIG. 2 is a cross-sectional view of a portion of a fuel cell 130 including an anode flow field plate 200, a cathode flow field plate 210, a cathode GDL 220, an anode GDL 230 and an MEA 240. Plate 200 has open-faced flow channels 202, and plate 210 has open-faced flow channels 212. MEA 240 includes a PEM 250, a cathode catalyst 260 and an anode catalyst 270.

As the anode gas and cathode gas flow through manifolds 120 and 125, respectively, they enter channels 202 and 212, respectively, and react to form DC electricity and water. A power conditioning system (PCS) 150 converts the DC electricity provided by fuel cell stack 110 to AC electricity, and provides the AC electricity to an electrical load 155 (e.g., a residence). An auxiliary power supply (e.g., a battery) 160 is connected to electrical load 155 (e.g., in parallel electrical communication with fuel cell stack 110) and supplies auxiliary electricity to load 155 through PCS 150 (e.g., when fuel cell stack 110 cannot provide enough power to meet the demands of load 155). In some embodiments, fuel cell stack 110 can be used to charge supply 160 during certain periods of time, such as when a fuel cell reaction is occurring within stack 110.

A sensor 165 is in electrical communication with load 155 and includes sensing circuitry that monitors the electricity demanded by load 155 (e.g., the electrical current demanded by load 155, and/or the electrical power demanded by load 155). A controller 170 is in electrical communication with sensor 165 so that controller 170 can monitor the signal output by sensor 165. Controller 170 is also in electrical communication with blower 145 so that controller 170 can control the power supplied to blower 145. In some embodiments, controller 170 is manually manipulated. For example, in these embodiments, controller 170 can correspond to a person monitoring the signal output by sensor 165. In certain embodiments, controller 170 is computer controlled.

With this arrangement, when the electricity demanded by load 155 exceeds a predetermined value or when the level in the electricity demanded by load 155 exceeds a predetermined value, controller 170 receives a corresponding signal from sensor 165, and controller 170 reduces the power to supply blower 145, which in turn can reduce the flow rate and/or throughput of cathode gas through cathode gas manifold 125. While this can reduce the electrical power output by fuel cell stack 110 to load 155, the electrical power output by supply 160 can increase to meet the demands of load 155.

Typically, controller 170 reduces the power to supply blower 145 so that the flow rate and/or throughput of cathode gas flowing through manifold 125 is reduced to the point where less than the desired stoichiometric amount of cathode gas is present in channels 212. In certain embodiments, controller 170 reduces the power to supply blower 145 to substantially zero.

In some embodiments, when the flow rate and/or throughput of cathode gas in manifold 125 is decreased, the flow rate and/or throughput of anode gas in manifold 120 is substantially unchanged. In some embodiments, when the flow rate and/or throughput of cathode gas in manifold 125 is decreased, the flow rate and/or throughput of anode gas in manifold 120 is reduced. In certain embodiments, when the flow rate and/or throughput of cathode gas in manifold 125 is decreased, the flow rate and/or throughput of anode gas in manifold 120 is increased. For example, the flow rate and/or throughput of anode gas in manifold 120 can be increased until the desired stoichiometric amount of anode gas in channels 202 is attained, at which point the amount of cathode gas in manifold 125 can be increased (e.g., by increasing the power supplied to blower 145) so that the desired stoichiometric amount of cathode gas in channels 212 is attained.

Without wishing to be bound by theory, it is believed that in a situation where the fuel cell is going negative, limiting the anode absolute voltage will prevent permanent non-reversible damage from occurring to the cell. Typically cells are seen to go negative in voltage when they are starved of fuel and/or oxidant. The magnitude of the negative voltage will depend on what reactant(s) the cell has been starved of. When there is oxidant starvation, protons that are carried through the membrane recombine with the electrons and we have hydrogen evolution on the cathode side. In other words, you have hydrogen pumping. When fuel starvation takes place, the proton generation is sustained by breaking water at the anode and thus leading to oxygen evolution on the anode side. In this case on the cathode side, water generation continues to take place. So we have oxygen pumping from the cathode to anode side when there is fuel starvation. When both fuel and oxidant starvation takes place, electrolysis takes place and you have oxygen evolution on the fuel cell anode and hydrogen evolution on the fuel cell cathode. In a case where the fuel stoich is 1.2 and the cathode stoich is 2.5 and the electrical load placed on a fuel cell exceeds the amount of load the fuel cell can output, the cell will become starved for fuel and go negative. In such a case the anode absolute potential may increase above the absolute cathode potential to a level of 0.6 v to 1.0 v (one of the most commonly used origins in the field of electrochemistry is that of Hydrogen adsorbing/evolving from a Platinum electrode. This is the same reaction that happens at the anode of a PEM fuel cell. So the anode is at very close to 0.0 v on this scale, the Cathode is about 0.6 v on this scale and hence the difference in potential (which we can measure using a voltmeter) turns out to be +0.6 v). If the cathode absolute potential remains at approximately 0.6 v the cell will show a negative voltage output. When the cell goes negative and the anode absolute potential is approaches 1.0 v, irreversible damage occurs to the fuel cell. However, if there is no oxidant present the fuel cell will move to air starvation mode and stop the electrochemical reaction thereby preventing the anode absolute voltage from approaching or exceeding 1.0 v. The anode absolute voltage will remain at approximately 0.0 v while the cathode absolute voltage may drop below the anode absolute voltage. Since there is no oxidant present the fuel cell cannot produce enough current to meet the load. The cathode absolute potential will fall below the anode absolute potential thereby producing a negative cell voltage. However the anode absolute potential has been prevented from elevating to damaging levels. So although the fuel cell has gone "negative" permanent damage has not been done to the fuel cell because the anode potential was limited with respect to the anode absolute voltage potential.

Therefore by reducing the amount of cathode gas in one or more fuel cells 130 to less than the desired stoichiometric amount when the electricity demanded by load 155 exceeds the predetermined value or when the change in level of electricity demanded by load 155 exceeds the predetermined value, this can reduce the tendency of fuel cell(s) 130 to operate in conditions where less than the desired stoichiometric amount of anode gas is present in cell(s) 130 (e.g., in embodiments where anode gas source 135 is unable to increase the supply of anode gas to manifold 120 fast enough for stack 110 to supply sufficient electricity to load 155 to provide all the electricity demanded by load 155 at a given time or over a given period of time). It is also believed that operating one or more fuel cells 130 under conditions where less than the stoichiometric amount of anode gas is present in cell(s) 130 can result in an increased amount of oxygen being present in anode flow field plate channels 202 so that reducing the tendency of cell(s) 130 to operate under conditions where less than the desired stoichiometric amount of anode gas is present in cell(s) 130 can reduce the amount of oxygen present in channels 202. It is further believed that reducing the amount of oxygen present in channels 202 can reduce the Ill occurrence and/or amount of oxidation (e.g., substantially irreversible oxidation) of anode catalyst(s) 270, which in turn can enhance the useful life of cells 130. In addition, it is believed that continuing to flow anode gas through channels 202 when the amount of cathode gas is reduced can result in an increased amount of hydrogen present in cathode flow field plate channels 212. It is believed that an increased amount of hydrogen in channels 212 can reduce the occurrence and/or amount of oxidation (e.g., substantially irreversible oxidation) of cathode catalyst(s) 260, which in turn can enhance the useful life of cells 130.

Figure 3:
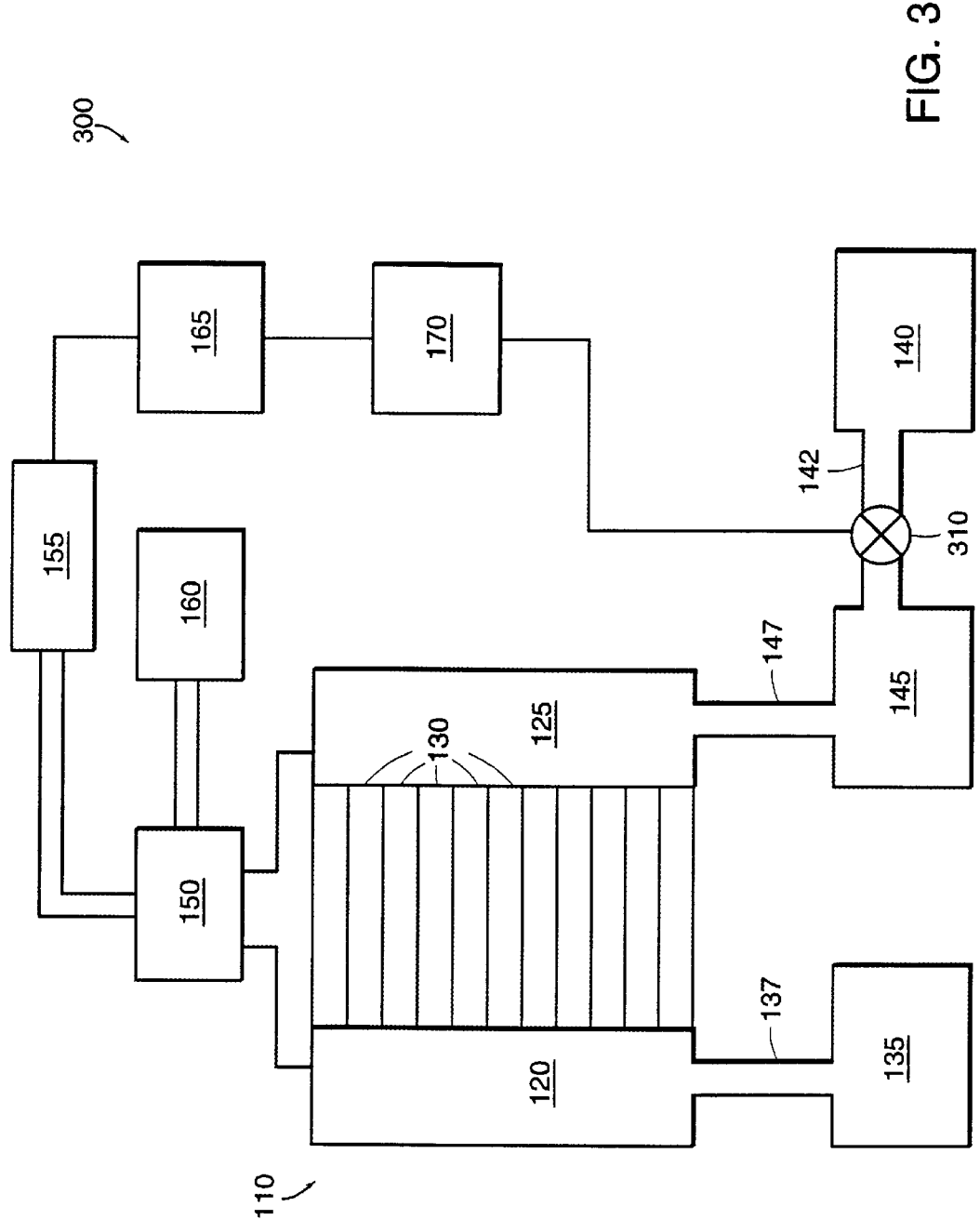
FIG. 3 is a block diagram of an embodiment of a fuel cell system.

FIG. 3 shows a block diagram of a fuel cell system 300 that includes a switching apparatus (e.g., a valve) 310 between blower 145 and cathode gas manifold 125. Controller 170 is in electrical communication with apparatus 310 rather than blower 145. With this arrangement, when sensor 165 sends a signal to controller 170 indicating that the electricity demanded by load 155 exceeds the predetermined value or that level of the electricity demanded by load 155 exceeds the predetermined value, controller 170 can change the position of apparatus 310, which in turn reduces the flow rate and/or throughput of cathode gas through cathode gas manifold 125 (e.g., by shunting some or all of the cathode gas flow along path out of conduit 147).

Although FIG. 3 shows an embodiment in which controller 170 is not in electrical communication with both blower 145 and switching apparatus 310, it is to be understood that in certain embodiments controller can be in electrical communication with both blower 145 and apparatus 310. In such embodiments, controller 170 can change the position of apparatus 310 and/or reduce the power to blower 145 in order to reduce the flow rate and/or throughput of cathode gas through cathode gas manifold 125.

Figure 4:
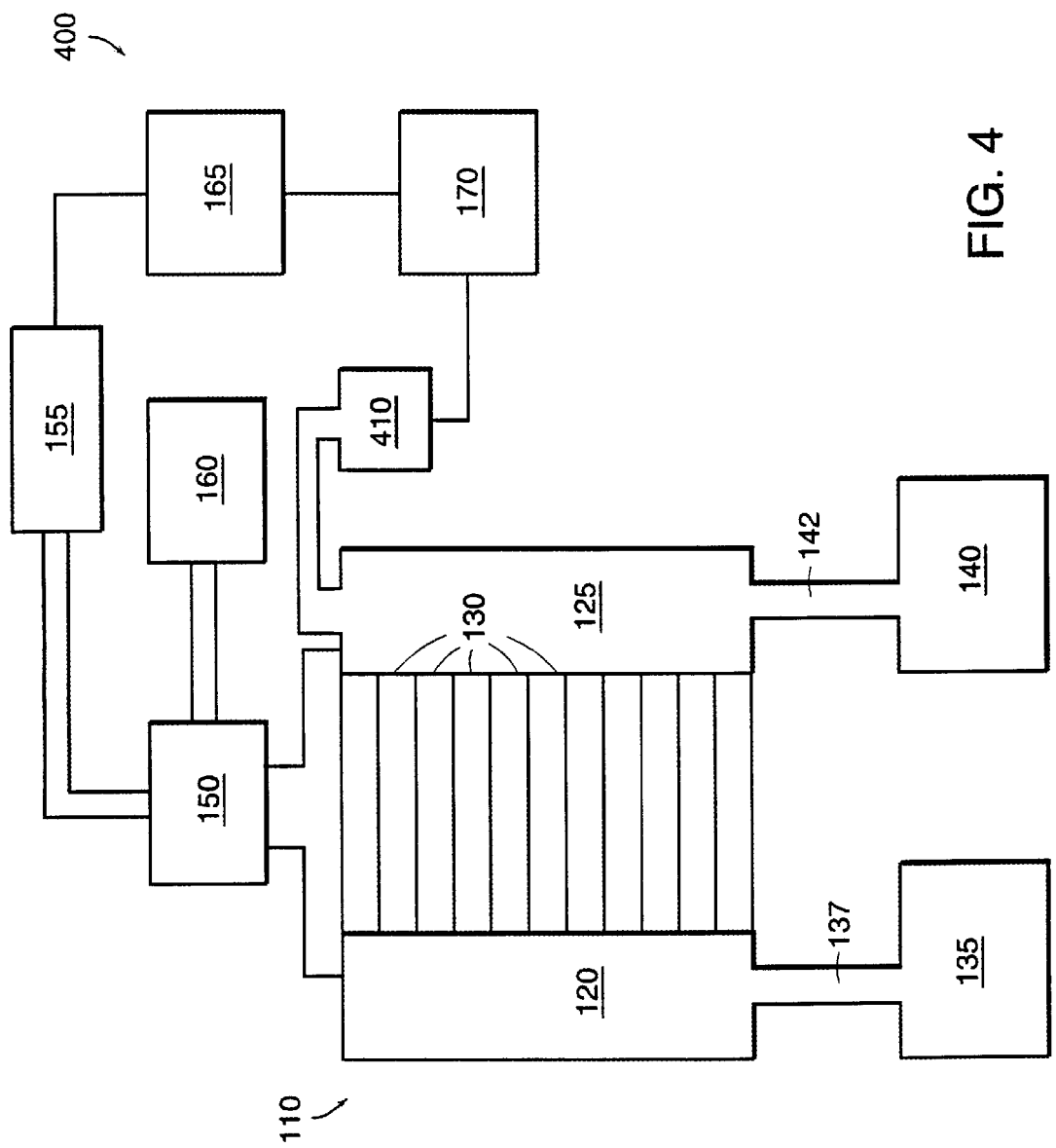
FIG. 4 is a block diagram of an embodiment of a fuel cell system.

FIG. 4 shows a system 400 in which blower 145 has been replaced by a pump (e.g., a vacuum pump) 410 on the outlet side of cathode gas manifold so that pump 410 can urge the cathode gas from cathode gas source 140 through cathode gas manifold 125. Controller 170 is in electrical communication with pump 410 so that when sensor 165 sends a signal to controller 170 indicating that the electricity demanded by load 155 exceeds the predetermined value, controller 170 can increase the power to pump 410, which in turn reduces the flow rate and/or throughput of cathode gas cells 130.

Figure 5:
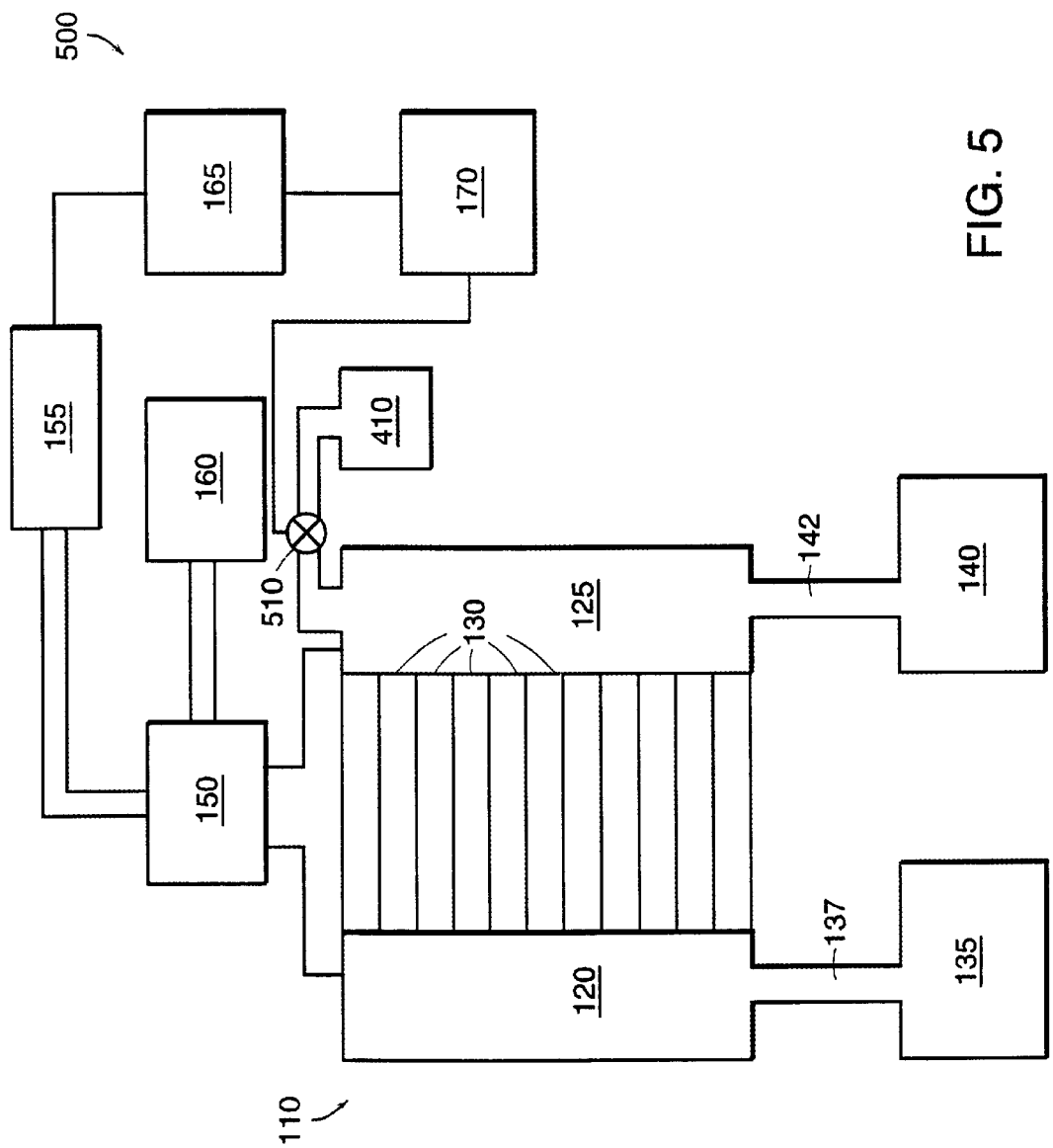
FIG. 5 is a block diagram of an embodiment of a fuel cell system.

FIG. 5 shows a block diagram of a fuel cell system 500 that includes a switching apparatus (e.g., a valve) 510 between pump 410 and cathode gas manifold 125. Controller 170 is in electrical communication with apparatus 510 rather than pump 410. With this arrangement, when sensor 165 sends a signal to controller 170 indicating that the electricity demanded by load 155 exceeds the predetermined value, controller 170 can change the position of switching apparatus 510 so that the flow rate and/or throughput of cathode gas through cathode gas manifold 125 is reduced (e.g., by positioning the switching apparatus 510 to block the vacuum formed by pump 410).

While FIG. 5 shows an embodiment in which controller 170 is not in electrical communication with both pump 410 and switching apparatus 510, it is to be understood that in certain embodiments controller can be in electrical communication with both pump 410 and switching apparatus 510. In such embodiments, when sensor 165 sends a signal to controller 170 indicating that the electricity demanded by load 155 exceeds the predetermined value, controller 170 can change the position of apparatus 510 and/or reduce the power to pump 410 in order to reduce the flow rate and/or throughput of cathode gas through cathode gas manifold 125.

While certain embodiments have been described, other embodiments are also contemplated. As an example, rather than responding to a change in the electricity demanded by load 155, the systems can be designed so that the sensor monitors a different parameter associated with the performance of the fuel cell stack. For example, in some embodiments, the sensor can be designed to monitor the amount of a gas (e.g., hydrogen or oxygen) present at the outlet of the cathode gas manifold and/or the anode gas manifold. In these embodiments, the sensor can send a signal to the controller that indicates that a change in the amount of a gas present at one or both manifold outlets corresponds to a change in the performance of the fuel cell stack (e.g., that the fuel cell stack is operating under conditions of less than a stoichiometric amount of anode gas). As another example, while shown in the figures as being separate components, those skilled in the art will appreciate that the sensor and the controller can be contained in a single unit that contains, for example, appropriate electronics componentry. As a further example, the systems need not include a PCS, particularly in embodiments where the load can use DC electricity (e.g., an automobile). As yet another example, the auxiliary power source need not be in electrical communication with the PCS. As still another example, the controller can be in electrical communication with the auxiliary power supply (e.g., so that the controller can manipulate the power output of the auxiliary power supply to the load). As a further example, one or more diodes can be included in the systems (e.g., between the fuel cell stack and/or the auxiliary power supply) to assist in controlling the direction in which electrical current flows in the systems. As an additional example, the auxiliary power supply need not be in parallel electrical communication with the fuel cell stack.

Other embodiments are in the claims.

What is claimed is:

1. A fuel cell system, comprising:
    a fuel cell having a cathode gas inlet, and an anode gas inlet;

a sensor configured to monitor a parameter associated with performance of the fuel cell during operation;

a blower configured to communicate cathode gas to the cathode gas inlet during operation of the fuel cell;

a second apparatus configured to communicate an anode gas to the anode gas inlet during operation; and a controller in communication with the sensor, the blower, and the second apparatus so that, when the parameter reaches a predetermined value, the controller sends a signal to the blower that reduces the flow rate of the cathode gas to the cathode gas inlet.

2. The fuel cell system of claim 1, wherein the fuel cell comprises a plurality of PEM-type fuel cells configured in a fuel cell stack.

3. The fuel cell system of claim 1, wherein the parameter is an electrical current associated with an electrical load on the fuel cell stack or a change in level of the electrical current associated with the electrical load.

4. The fuel cell system of claim 1, wherein the parameter is an electrical potential associated with an electrical load on the fuel cell stack, or a change in level of the electrical potential associated with the electrical load.

5. The fuel cell system of claim 1, wherein the parameter is an electrical power associated with an electrical load on the fuel cell, or a change in level of the electrical power associated with the electrical load.

6. The fuel cell system of claim 1, wherein the parameter is an amount of a reactant gas present at an anode gas outlet region of the fuel cell.

7. The fuel cell system of claim 1, wherein the parameter is an amount of a reactant gas present at a cathode gas outlet region of the fuel cell stack.

8. The fuel cell system of claim 1, wherein, when the parameter reaches the predetermined value, the signal sent by the controller to the blower reduces electrical power for the blower.

9. The fuel cell system of claim 1, further comprising an auxiliary power supply, the auxiliary power supply and the fuel cell being in parallel electrical communication with an electrical load so that, when the parameter reaches the predetermined value, the electrical power output of the auxiliary power supply increases.

10. The fuel cell system of claim 1, wherein the controller is manually controlled in response to the signal from the sensor.

11. The fuel cell system of claim 1, wherein the controller is computer controlled in response to the signal from the sensor.

* * * * *